United States Patent
Tripathi et al.

(10) Patent No.: US 9,197,903 B2
(45) Date of Patent: Nov. 24, 2015

(54) METHOD AND SYSTEM FOR DETERMINING A MACROBLOCK PARTITION FOR DATA TRANSCODING

(75) Inventors: Subarna Tripathi, West Bengal (IN); Kaushik Saha, Delhi (IN); Emiliana Mario Picinelli, Briannaza (IT)

(73) Assignees: STMICROELECTRONICS S.R.L., Agrate Brianza (MB) (IT); STMICROELECTRONICS INTERNATIONAL N.V., Amsterdam (NL)

( * ) Notice: Subject to any disclaimer, the term of this patent is extended or adjusted under 35 U.S.C. 154(b) by 1768 days.

(21) Appl. No.: 12/253,062

(22) Filed: Oct. 16, 2008

(65) Prior Publication Data

US 2009/0103622 A1    Apr. 23, 2009

(30) Foreign Application Priority Data

Oct. 17, 2007   (IN) .......................... 2177/DEL/2007

(51) Int. Cl.
| | |
|---|---|
| H04N 7/12 | (2006.01) |
| H04N 19/59 | (2014.01) |
| H04N 19/176 | (2014.01) |
| H04N 19/196 | (2014.01) |
| H04N 19/103 | (2014.01) |
| H04N 19/40 | (2014.01) |

(52) U.S. Cl.
CPC ............. *H04N 19/59* (2014.11); *H04N 19/103* (2014.11); *H04N 19/176* (2014.11); *H04N 19/196* (2014.11); *H04N 19/40* (2014.11)

(58) Field of Classification Search
USPC .......... 375/E7.198, 240.12–240.16; 382/236
See application file for complete search history.

(56) References Cited

U.S. PATENT DOCUMENTS

| | | | |
|---|---|---|---|
| 6,631,240 B1 * | 10/2003 | Salesin et al. ................. 386/290 |
| 2003/0072371 A1 * | 4/2003 | Mihara .................... 375/240.13 |
| 2007/0223579 A1 * | 9/2007 | Bao .......................... 375/240.12 |
| 2008/0025391 A1 * | 1/2008 | Amon et al. ............. 375/240.02 |

* cited by examiner

*Primary Examiner* — Farid Homayounmehr
*Assistant Examiner* — Suman Debnath
(74) *Attorney, Agent, or Firm* — Allen, Dyer, Doppelt, Milbrath & Gilchrist, P.A.

(57) ABSTRACT

A system and corresponding method determines a macroblock partition to transcode digital data from a first video standard to a second video standard with any spatial resolution. The system includes a processing module and an encoding module. The processing module processes digital data to determine a macroblock partition. The encoding module is coupled to the processing module for encoding the digital data based on the macroblock partition. The system is further coupled to a decoding module for receiving the digital data. The method determines the partition of a macroblock for transcoding digital data with any spatial resolution and without any motion estimation.

14 Claims, 6 Drawing Sheets

METHOD AND SYSTEM FOR DETERMINING A MACROBLOCK PARTITION FOR DATA TRANSCODING

FIELD OF THE INVENTION

The present invention relates to the field of communications, and more specifically, to determining a macroblock partition to transcode data from one video standard to another video standard with any spatial resolution.

BACKGROUND OF THE INVENTION

Video coding technologies are widely used in the communications field. Digital video contents exist in coded form for saving storage. Coding includes MPEG-2 technology defined by the Moving Picture Experts Group (MPEG), for example. Transcoding coded video contents from one format to another, from one bit rate to another and from one resolution to another are indispensable in many multimedia applications. Multimedia applications include, for example, digital video broadcasting, video on demand (VOD), teleconferencing, long distance learning, and so on.

One approach involves transcoding into an H.264 sequence with arbitrary spatial resolution out of an MPEG-2 main profile sequence. This approach reuses parameters of a source MPEG-2 macroblock into an H.264 macroblock based on a one-to-one mapping. A second approach involves producing one motion vector per macroblock of the target resolution by using motion vectors of the source picture so only a 16×16 partition is generated for new target macroblocks. This approach cannot exploit the compression efficiency tool of supporting smaller partitions.

A third approach involves MPEG-2H.264 transcoding with down sampling that exploits variable block-size motion estimation features of H.264. The resolution change permitted is only half the spatial resolution, and it is not meant for an arbitrary resolution change. A fourth approach involves video transcoding with variable block-sized motion estimation, which is a top-down approach. Partitioned motion vectors are determined based on the determined motion vector of the 16×16 partitions. A fifth approach involves an arbitrary video downsizing in which the motion vector determination logic is based on an area-weighted-median vector.

All the candidates for macroblock partition mode selection are not always considered. Instead, the dominant partition for combination has the most influence. A sixth approach involves an H.264-H.264 arbitrary resolution change. This approach utilizes the additional information available in H.264 data as compared with MPEG2, and does not completely avoid motion-estimation. It uses a search window having a size 2 to 6. This approach uses the strategy of making the smallest partition's motion vector first (bottom-up approach), then continues to merge the smaller partitions into larger ones up to a 16×16 partition (mode refinement strategy) as determined by some of the conditions. Hence, this reduces the efficiency since such a strategy has computational complexity.

SUMMARY OF THE INVENTION

In view of the foregoing background, an object of the present invention is to provide a system and method for determining a macroblock partition to transcode data from one video standard (such as any MPEG-2) to another video standard (such as an H.264 sequence) with any spatial resolution. This may advantageously avoid motion estimation, and at the same time, provides good compression efficiency at an acceptable quality with much less time and complexity.

This and other objects, advantages and features in accordance with the present invention are provided by a method for determining a macroblock partition to transcode digital data with an arbitrary spatial resolution comprising processing the digital data, generating at least one motion vector for a plurality of macroblock partitions, and determining a plurality of macroblock residuals for the plurality of macroblock partitions. The macroblock partition and a macroblock encoding mode may be selected based on a minimum macroblock residual value selected from the plurality of macroblock residuals. The digital data may be encoded based on the macroblock partition.

Another aspect is directed to a system for determining a macroblock partition to transcode digital data with an arbitrary spatial resolution. The system may comprise a processing module for processing the digital data to determine a macroblock partition, and an encoding module operatively coupled to the processing module for encoding the digital data based on the macroblock partition.

BRIEF DESCRIPTION OF DRAWINGS

The aforementioned aspects and other features of the present invention will be explained in the following description, taken in conjunction with the accompanying drawings, wherein.

DETAILED DESCRIPTION OF THE PREFERRED EMBODIMENTS

Figure 1:
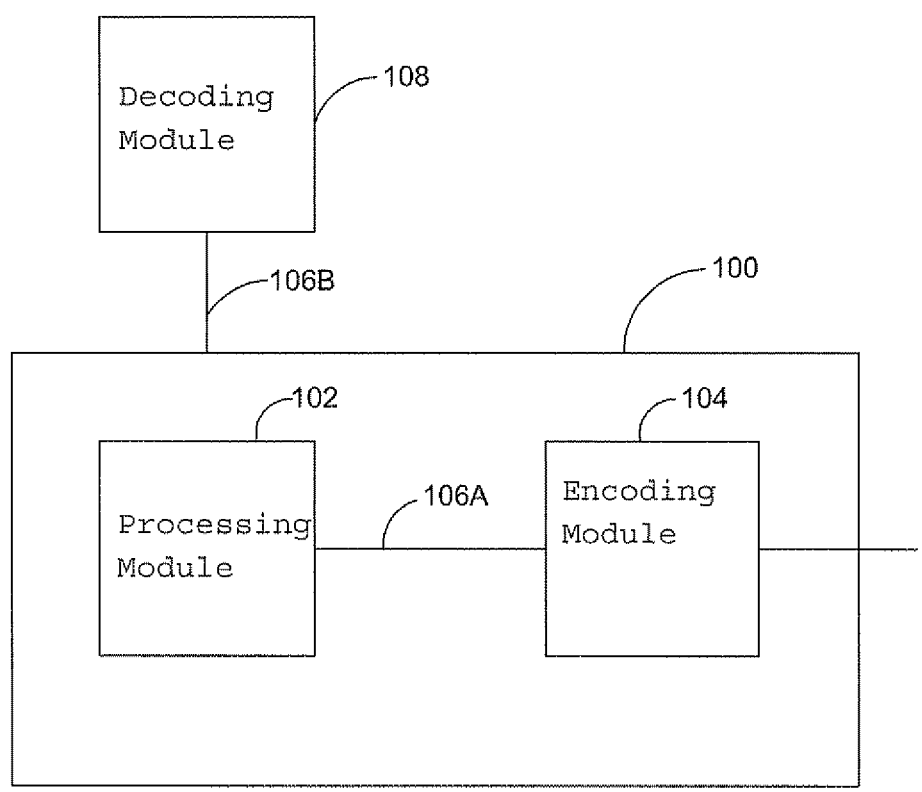
FIG. 1 illustrates a block diagram of a system for determining a macroblock partition to transcode digital data according to an embodiment of the present invention.

The embodiments of the present invention will be described in detail with reference to the accompanying drawings. However, the present invention is not limited to the illustrated embodiments. The present invention can be modified in various forms. The illustrated embodiments are provided to explain more clearly the present invention to those of ordinary skill in the art. In the accompanying drawings, like reference numerals are used to indicate like components.

FIG. 1 illustrates a block diagram of a system 100 for determining a macroblock partition to transcode digital data from one video standard to another video standard with an arbitrary spatial resolution. The system 100 includes a processing module 102 and an encoding module 104. The processing module 102 processes digital data to determine a macroblock partition. The encoding module 104 is coupled to the processing module 102 for encoding the digital data based on the macroblock partition and a macroblock encoding mode. The system 100 is coupled to a decoding module 108 for receiving an input signal. The processing module 102, the encoding module 104 and the decoding module 108 are coupled through connections 106A and 106B.

The system 100 does not use motion estimation to avoid expensive operations. At the same time, this provides good compression efficiency at an acceptable quality with much less time and complexity. The system 100 maintains operational compatibility and supports an arbitrary spatial resolution change in transcoding the data from a first video standard to a second video standard.

The spatial resolution change can be required for various reasons, such as a way to reduce bit rate. The spatial resolution change can also be necessary to change the format so that the equipment can display the video. For example, if the provided video stream is in High Definition (HD) but the monitor used can only display Standard Definition (SD), a format change will be necessary. The term "transcoding with arbitrary resolution" refers the conversion process of a compressed video bit stream to a new standard that can support any resolution even different from the original resolution or source resolution.

The system 100 provides good compression efficiency with very low processing delay. The macroblock encoding mode is a best encoding mode and its selection is based on a minimum value of a macroblock residual of a macroblock partition. The digital data may be a picture data, for example.

According to one embodiment, the first video standard may be a MPEG-2 standard and the second video standard may be an H.264 standard. The H.264 standard achieves much of compression due to having different macro-block partitions up to 4×4 for motion compensation, and provides 20% more compression than using only the 16×16 partition. Partition sizes less than 8×8 (8×4, 4×8 and 4×4) add little advantage. The H.264 is a standard for video compression, and is also known as an MPEG-4 Part 10 or an Advanced Video Coding (AVC).

Macroblock refers to a 16×16 block of luma samples and two corresponding blocks of chroma samples. The macroblock can be subdivided further into smaller blocks called macroblock partitions or partitions. Motion vector refers to a two-dimensional vector used for inter-prediction and provides an offset from coordinates in the decoded picture to the coordinates in a reference picture. Intraframe (I-frame) is a single frame having digital contents, which the compressor examines independent of the frames that precede and follow it. Intraframe keeps all of the data needed to display the frame. An interframe or non-intraframe is a frame, which is expressed as the change from one or more other frames. Anti-aliasing is a method for minimizing or reducing the distortion artifacts known as aliasing when representing a high-resolution signal at a lower resolution.

FIGS. 2-5 respectively illustrate partitions of 16×16, 16×8, 8×6 and 8×8, which are responsible for most of the compression. The MPEG-2 standard lacks these partition features, and hence provides an additional scope for increasing the transcoding efficiency of the H.264 standard with arbitrary resolution by utilizing different partitions. The transcoding objective does not allow proper motion estimation.

An algorithm may be used to determine how best to partition a macroblock for transcoding the H.264 standard with arbitrarily changed spatial resolution and without any motion estimation. Thus, the transcoding algorithm provides at least 12 to 15 times faster operations than a re-encoding approach while providing a quality comparable to that of the re-encoding approach. The algorithm does not use any type of bottom-up or top-down approach for determining motion vectors of the macroblock partitions. The algorithm gives same weight in the order of evaluation of the partitions' motion vector.

Figure 2:
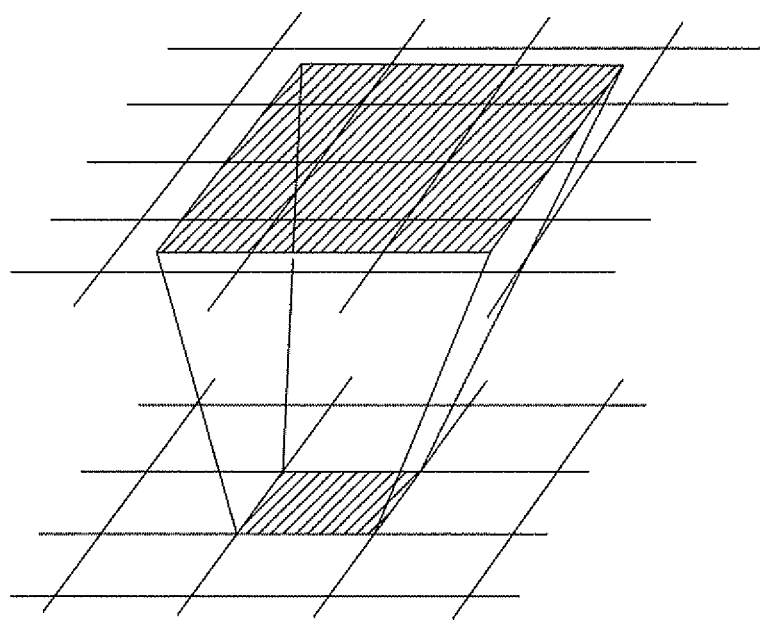
FIG. 2 illustrates a macroblock partition of 16×16 for motion compensation according to an embodiment of the present invention.

The motion estimation can be avoided by using a strategy that provides an acceptable quality of the transcoding and reduces computational complexity. The motion vector of each partition of each macroblock is calculated and illustrated in FIGS. 2-5. FIG. 2 illustrates two complete macroblocks and ten partial macroblocks which are the deciding factor of a motion vector of one 16×16 partition.

Figure 3:
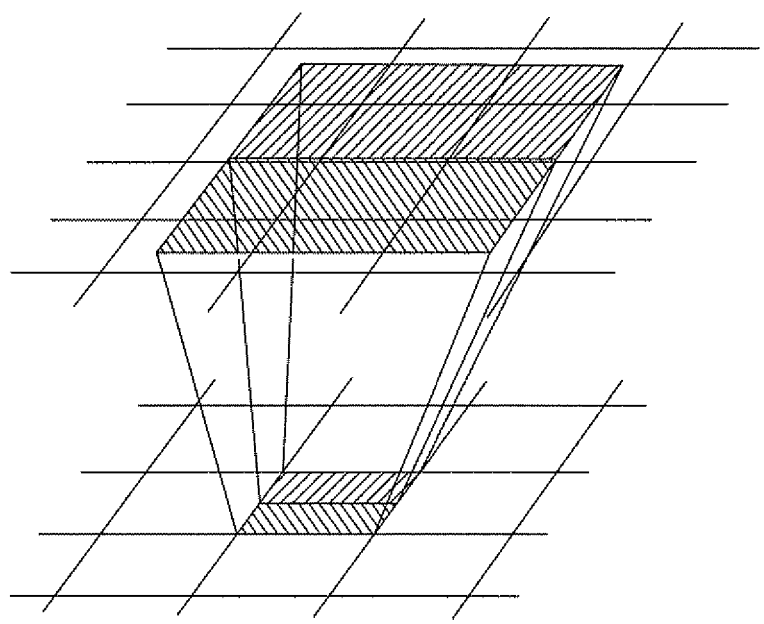
FIG. 3 illustrates a macroblock partition of 16×8 for motion compensation according to another embodiment of the present invention.
Figure 4:
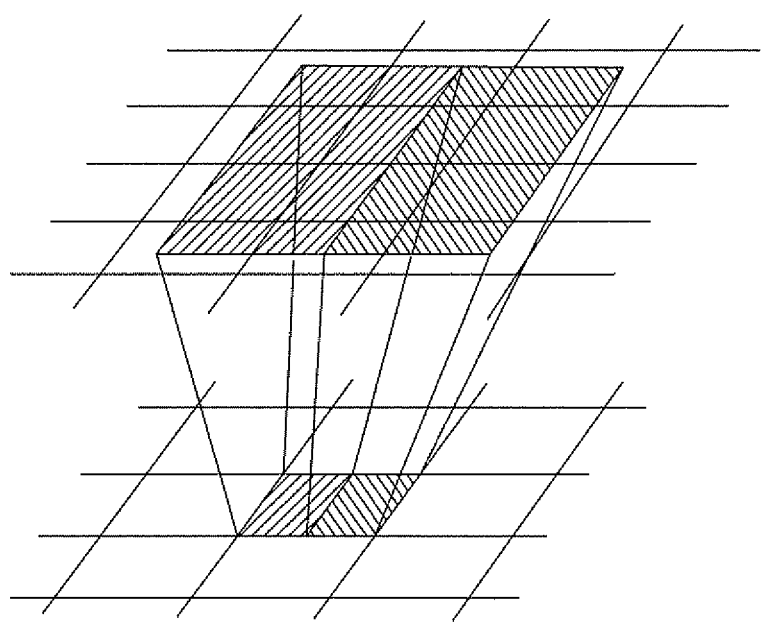
FIG. 4 illustrates a macroblock partition of 8×16 for motion compensation according to yet another embodiment of the present invention.
Figure 5:
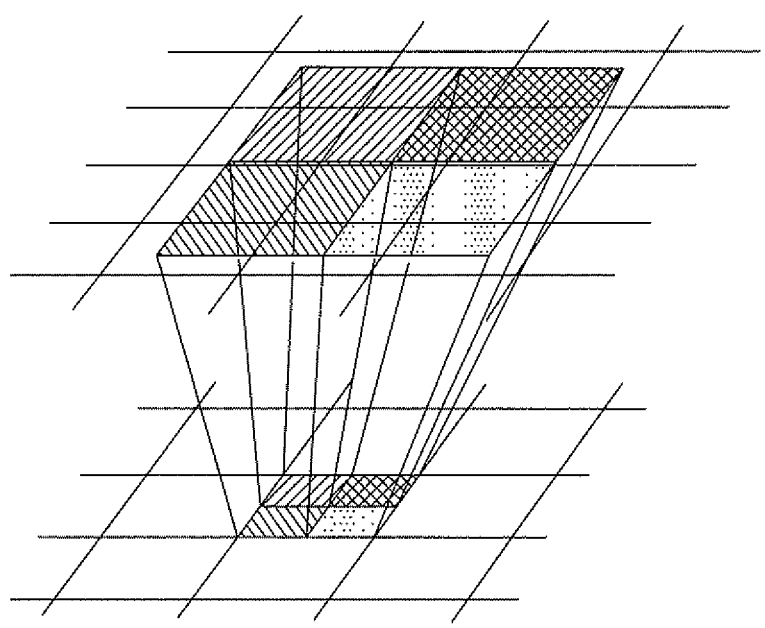
FIG. 5 illustrates a macroblock partition of 8×8 for motion compensation according to yet another embodiment of the present invention.

FIG. 3 illustrates six partial macroblocks determining the motion vector of an upper 16×8 partition, and eight partial macroblocks and one complete macroblock are deciding the motion vector of the lower 16×8 partition. Similarly, FIGS. 4-5 illustrate the conditioning of the two 8×16 partitions' motion vectors and four 8×8 partitions' motion vectors. This approach is explained in the pseudo code as illustrated below.

```
Encode_H264_sequence ( )
{
    Resizing and anti-aliasing the picture
    Determine_motion_vectors_for_macroblock_partition ( )
    Start_h264_Encoding ( )
}
Determine_motion_vectors_for_macroblock_partition( )
{
    For each Macroblock of the target resolution
    Map motion vector for 16×16 partition
    Map motion vector for two 16×8 partitions
    Map motion vector for two 8×16 partitions
    Map motion vector for four 8×8 partitions
    End
}
Start_h264_Encoding ( )
{
    For each macroblock of the target resolution
        Encode_MB ( )
    End
}
Encode_MB( )
{
    If (!INTRA)
    {
        Test_Inter_Pred_MB( )
        Test_Inter_Pred_SubMB( )
    }
    Calculate residual for intra 16×16 and intra 4×4
    Calculate direct mode cost
    DecisionBestMode( )
    Code the residuals
    Set motion vectors
}
Test_Inter_Pred_MB( )
{
    For mode 16×16, 16×8 and 8×16
    Calculate residual
    End
    Select the macroblock partition type which
        produces smallest
Residual
}
Test_Inter_Pred_SubMB( )
{
    Calculate residual for 8×8 sub-partition
}
DecisionBestMode ( )
{
    Choose the best mode between
    intra 16×16, intra 4×4, inter 16×16, inter16×8,
    inter8×16,
    inter 8×8 and direct mode depending on smallest
        residual value
}
```

An explanation of the above-mentioned pseudo-code is provided below.

The encoding process of each picture starts with resizing and anti-aliasing of the yuv picture by any standard filter. In this embodiment, a poly-phase filter has been used. Once the resizing of the yuv picture data for each of the macroblock of the target H.264 picture's resolution is completed, motion vectors for all possible macroblock partitions up to 8×8 are determined for a non-intra picture.

If the incoming MPEG-2 picture is of type B, i.e., bi-directional, the same steps are followed for backward prediction. Hence, for any non-intra picture, a single motion vector for 16×16, two motion vectors for 16×8, two motion vectors for 8×16 and four motion vectors for 8×8 partitions for each of the macroblocks are determined.

If the incoming MPEG-2 picture coding type is non-intra, then for each of the target H.264 macroblock residual or a sum of absolute difference (SAD) calculation for all four macroblock partitions, i.e., up to 8×8, is performed using the determined motion vectors. Then residuals are determined for intra 16×16 and different 4×4 intra types. If the incoming MPEG-2 picture is a bi-directional picture then residuals for direct motion vectors are also determined. After determining the residuals for all these possible candidates, the best mode of the macroblock is selected based on the minimum residual value produced by each of the candidates. After selecting the mode, the macroblock is coded with that mode, that partition and that motion vector if prediction mode is selected.

For calculating the overlapped area, first of all for each participating block, the left (xl), top (yt), right (xr) and bottom (yb) pixel locations are determined. If the overlapping area is greater than or equal to one-forth of any partition then that macroblock's motion vector is added into the list of the candidate motion vector. Otherwise. It is left alone. If the overlapping area is at least 25% of the whole 16×16 macroblock, then this macro-block's motion vector becomes a candidate.

After preparation of the list, the median of those motion vectors is taken, and then the vector is scaled in an appropriate ratio that can be different for horizontal and vertical directions if the aspect ratio is also changed. The partition type with the smallest sum of absolute difference (SAD) is then chosen as the final motion vector and partition.

Figure 6:
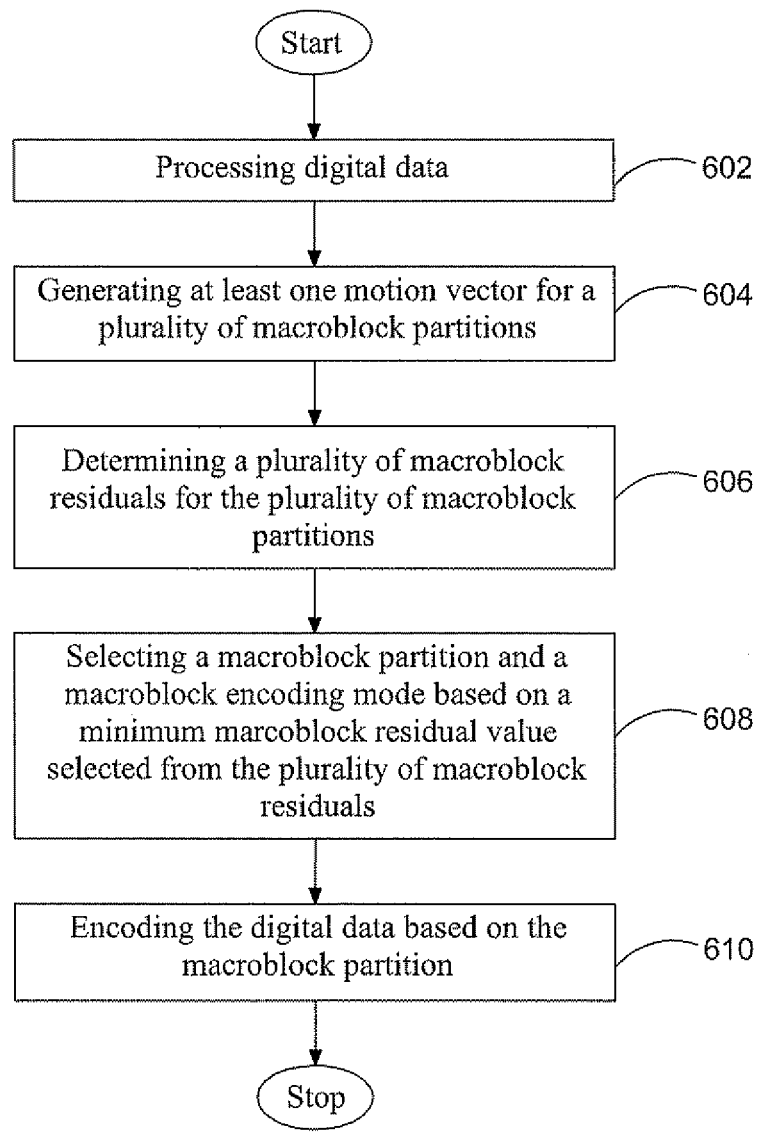
FIG. 6 illustrates a flow diagram of a method for determining a macroblock partition to transcode digital data according to an embodiment of the present invention.

FIG. 6 illustrates a flow diagram of a method for determining a macroblock partition to transcode digital data with an arbitrary spatial resolution according. At step 602, the digital data is processed. At step 604, at least one motion vector is generated for a plurality of macroblock partitions. At step 606, a plurality of macroblock residuals are determined for the plurality of macroblock partitions. At step 608, the macroblock partition and a macroblock encoding mode are selected based on a minimum macroblock residual value selected from the plurality of macroblock residuals. At step 610, the digital data is encoded based on the macroblock partition.

The illustrated embodiment is related to a method for determining a macroblock partition and can be used in various applications, such as a transcoder for transcoding from a first standard such as MPEG-2 to a second standard such as H.264 of any desired resolution. Further, different embodiments can be used for enabling interoperability of various multimedia devices.

The illustrated embodiments describe a system and method for determining a macroblock partition to transcode digital data from one standard to another, which offers many advantages. First, the illustrated embodiments may determine a macroblock partition for transcoding into H.264 with an arbitrary resolution change. This is useful in reducing bit-rates, and in changing formats needed for display devices. Second, the illustrated embodiments provide an efficient mechanism to convert video bitstreams from one coding format to another, including syntax, bitrate and resolution conversions.

Third, a transcoding system provides enhanced compression efficiency with very low processing delay.

Although the above discussed system and method have been described in connection with the different embodiments as illustrated in the accompanying drawings, it is not limited thereto. It will be apparent to those skilled in the art that various substitutions, modifications and changes may be made thereto without departing from the scope and spirit of the disclosure.

That which is claimed:

1. A method for selecting a macroblock partition to transcode digital data with an arbitrary spatial resolution from a first video standard to a second video standard, the method comprising:

a hardware decoder for decoding an input signal to generate the digital data, with the digital data being based on a single input signal;

a hardware processor for processing the digital data corresponding to the first video standard, the processing comprising resizing and anti-aliasing the digital data;

determining a plurality of partitions for a macroblock for transcoding the second video standard with an arbitrarily changed spatial resolution and without any motion estimation;

generating at least one motion vector for a plurality of macroblock partitions so as to avoid motion estimation;

determining a plurality of macroblock residuals for the plurality of macroblock partitions;

selecting the macroblock partition and a macroblock encoding mode based on a minimum macroblock residual value selected from the plurality of macroblock residuals; and encoding the digital data based on the selected macroblock partition to the second video standard.

2. The method according to claim 1, wherein the plurality of macroblock residuals is determined for a 16×16 partition, a 16×8 partition, a 8×16 partition and a 8×8 partition for non-intra frames.

3. The method according to claim 1, wherein the plurality of macroblock residuals is further determined for an intra 16×16 partition and an intra 4×4 partition.

4. A method for transcoding digital data from a first video standard to a second video standard, the method comprising:

a hardware decoder for decoding an input signal to generate the digital data, with the digital data being based on a single input signal;

a hardware processor for processing the digital data corresponding to the first video standard for resizing and anti-aliasing the digital data, determining a plurality of partitions for a macroblock for transcoding the second video standard with an arbitrarily changed spatial resolution and without any motion estimation, generating at least one motion vector for a plurality of macroblock partitions so as to avoid motion estimation, determining a plurality of macroblock residuals for the plurality of macroblock partitions, and selecting the macroblock partition and a macroblock encoding mode based on a macroblock residual value selected from the plurality of macroblock residuals; and encoding the digital data based on the selected macroblock partition to the second video standard.

5. The method according to claim 4, wherein the macroblock residual value selected by the processing comprises a minimum macroblock residual value.

6. The method according to claim 4, wherein the plurality of macroblock residuals is determined for a 16×16 partition, a 16×8 partition, a 8×16 partition and a 8×8 partition for non-intra frames.

7. The method according to claim 4, wherein the plurality of macroblock residuals is further determined for an intra 16×16 partition and an intra 4×4 partition.

8. A system for selecting a macroblock partition to transcode digital data with an arbitrary spatial resolution from a first video standard to a second video standard, the system comprising:
 a hardware decoder for decoding an input signal to generate the digital data, with the digital data being based on a single input signal;
 a hardware processor for processing the digital data corresponding to the first video standard for determining the macroblock partition, the processing comprising
  resizing and anti-aliasing the digital data,
  determining a plurality of partitions for a macroblock for transcoding the second video standard with an arbitrarily changed spatial resolution and without any motion estimation,
  generating at least one motion vector for a plurality of macroblock partitions so as to avoid motion estimation,
  determining a plurality of macroblock residuals for the plurality of macroblock partitions, and
  selecting the macroblock partition and a macroblock encoding mode based on a minimum macroblock residual value selected from the plurality of macroblock residuals; and
 an encoder operatively coupled to said processor for encoding the digital data based on the selected macroblock partition to the second video standard.

9. The system according to claim 8, wherein the plurality of macroblock residuals is determined in said processor for a 16×16 partition, a 16×8 partition, a 8×16 partition and a 8×8 partition for non-intra frames.

10. The system according to claim 8, wherein the plurality of macroblock residuals is further determined in said processor for an intra 16×16 partition and an intra 4×4 partition.

11. A system comprising:
 a hardware decoder for decoding an input signal to generate digital data, with the digital data being based on a single input signal;
 a hardware processor for selecting a macroblock partition to transcode digital data with an arbitrary spatial resolution from a first video standard to a second video standard, the processing comprising
  resizing and anti-aliasing the digital data,
  determining a plurality of partitions for a macroblock for transcoding the second video standard with an arbitrarily changed spatial resolution and without any motion estimation,
  generating at least one motion vector for a plurality of macroblock partitions so as to avoid motion estimation,
  determining a plurality of macroblock residuals for the plurality of macroblock partitions, and
  selecting the macroblock partition and a macroblock encoding mode based on a macroblock residual value selected from the plurality of macroblock residuals; and
 an encoder operatively coupled to said processor for encoding the digital data based on the selected macroblock partition to the second video standard.

12. The system according to claim 11, wherein the macroblock residual value selected by said processing comprises a minimum macroblock residual value.

13. The system according to claim 11, wherein the plurality of macroblock residuals is determined in said processor for a 16×16 partition, a 16×8 partition, a 8×16 partition and a 8×8 partition for non-intra frames.

14. The system according to claim 11, wherein the plurality of macroblock residuals is further determined in said processor for an intra 16×16 partition and an intra 4×4 partition.

* * * * *